US009866462B2

(12) United States Patent
Onoue

(10) Patent No.: US 9,866,462 B2
(45) Date of Patent: Jan. 9, 2018

(54) INFORMATION PROCESSING SYSTEM AND INFORMATION PROCESSING METHOD

(71) Applicant: FUJITSU LIMITED, Kawasaki-shi, Kanagawa (JP)

(72) Inventor: Koichi Onoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 14/886,154

(22) Filed: Oct. 19, 2015

(65) Prior Publication Data
US 2016/0191360 A1 Jun. 30, 2016

(30) Foreign Application Priority Data

Dec. 26, 2014 (JP) .................................. 2014-265797

(51) Int. Cl.
H04L 12/26 (2006.01)
H04L 12/24 (2006.01)

(52) U.S. Cl.
CPC ........ H04L 43/0876 (2013.01); H04L 41/142 (2013.01); H04L 43/062 (2013.01); H04L 43/067 (2013.01)

(58) Field of Classification Search
CPC . H04L 43/0876; H04L 41/142; H04L 43/067; H04L 43/062
See application file for complete search history.

(56) References Cited

U.S. PATENT DOCUMENTS

| 2003/0189904 A1* | 10/2003 | Li | H04L 41/142 370/252 |
| 2005/0232151 A1* | 10/2005 | Chapweske | H04L 1/0002 370/231 |
| 2006/0120389 A1* | 6/2006 | Sampath | H04L 12/462 370/401 |
| 2008/0181229 A1* | 7/2008 | Williams | H04L 45/10 370/394 |
| 2011/0156947 A1* | 6/2011 | Kanamoto | G01S 3/74 342/107 |
| 2011/0191628 A1* | 8/2011 | Noguchi | G06F 11/16 714/6.2 |
| 2013/0208814 A1* | 8/2013 | Argyropoulos | H04N 17/004 375/240.27 |
| 2015/0012628 A1* | 1/2015 | Chatterjee | G06F 9/4416 709/222 |

(Continued)

FOREIGN PATENT DOCUMENTS

| JP | 2003-188769 | 7/2003 |
| JP | 2008-311720 | 12/2008 |
| JP | 2011-137650 | 7/2011 |

Primary Examiner — Abdullahi E Salad
(74) Attorney, Agent, or Firm — Fujitsu Patent Center

(57) ABSTRACT

An information processing system includes: a communication device; and a management device configured to manage the communication device, wherein the management device: acquires traffic information on a port of the communication device at a plurality of time points from the communication device; calculates a plurality of autocorrelation coefficients based on the traffic information at the plurality of time points; calculates a plurality of weights based on the plurality of autocorrelation coefficients; and calculates a weighted average of traffic at the plurality of time points based on the plurality of weights and the traffic information at the plurality of time points.

16 Claims, 20 Drawing Sheets

(56) References Cited

U.S. PATENT DOCUMENTS

2016/0026922 A1\* 1/2016 Vasseur .................. G06N 5/048
　　　　　　　　　　　　　　　　　　　706/12
2016/0028608 A1\* 1/2016 Dasgupta ................ H04L 43/16
　　　　　　　　　　　　　　　　　　　370/252
2016/0028632 A1\* 1/2016 Vasseur .................. H04L 12/28
　　　　　　　　　　　　　　　　　　　370/237

\* cited by examiner

FIG. 5

| TIME POINT | TRAFFIC OF PORT A |
|---|---|
| $t_1$ | 100 |
| $t_2$ | 300 |
| $t_3$ | 100 |
| $t_4$ | 300 |
| $t_5$ | 100 |
| $t_6$ | 300 |
| ⋮ | ⋮ |

FIG. 8

| k | p(k) |
|---|---|
| 1 | 0.11 |
| 2 | 0.62 |
| 3 | -0.40 |
| 4 | -0.28 |
| 5 | 0.06 |
| ⋮ | ⋮ |

FIG. 9

| k | $w_k$ |
|---|---|
| 1 | 0 |
| 2 | 0.62 |
| 3 | 0.40 |
| 4 | 0 |
| 5 | 0 |
| ⋮ | ⋮ |

FIG. 12

| PORT | PREDICTED VALUE ($t_x$) |
|---|---|
| PORT A | 300 |
| PORT B | 450 |
| PORT C | 120 |
| PORT D | 200 |
| PORT E | 100 |
| ⋮ | ⋮ |

INFORMATION PROCESSING SYSTEM AND INFORMATION PROCESSING METHOD

CROSS-REFERENCE TO RELATED APPLICATIONS

This application is based upon and claims the benefit of priority from the prior Japanese Patent Application No. 2014-265797 filed on Dec. 26, 2014, the entire contents of which are incorporated herein by reference.

FIELD

The embodiments discussed herein are related to an information processing system and an information processing method.

BACKGROUND

In an information processing system constructed inside, for example, a data center, a plurality of virtual objects such as, for example, virtual machines or virtual routers are executed on a plurality of physical machines.

Related techniques are disclosed in, for example, Japanese Laid-Open Patent Publication No. 2008-311720.

SUMMARY

According to one aspect of the embodiments, an information processing system includes: a communication device; and a management device configured to manage the communication device, wherein the management device: acquires traffic information on a port of the communication device at a plurality of time points from the communication device; calculates a plurality of autocorrelation coefficients based on the traffic information at the plurality of time points; calculates a plurality of weights based on the plurality of autocorrelation coefficients; and calculates a weighted average of traffic at the plurality of time points based on the plurality of weights and the traffic information at the plurality of time points.

The object and advantages of the invention will be realized and attained by means of the elements and combinations particularly pointed out in the claims. It is to be understood that both the foregoing general description and the following detailed description are exemplary and explanatory and are not restirctive of the invention, as claimed.

BRIEF DESCRIPTION OF DRAWINGS

FIG. 5 illustrates an example of data of a traffic data storage unit;

FIG. 8 illustrates an example of data of an autocorrelation coefficient storage unit;

FIG. 9 illustrates an example of data in a weight storage unit;

FIG. 12 illustrates an example of data in a predicted value storage unit;

DESCRIPTION OF EMBODIMENTS

For example, when a virtual object is collectively arranged on a specific physical machine, the traffic of a network connecting physical machines may be concentrated on a specific path so that a desired throughput may not be obtained. For example, the migration of the virtual object and the like may be performed according to a predicted value of the traffic of the network to eliminate the deviation of the traffic.

For example, in some cases, the traffic of a network may repeat a constant variation in a constant cycle. In a time-series analysis, the data having a constant variation characteristic independently of a time point may be referred to as data having a stationarity. The data satisfying both conditions that (1) an expected value $E[v_t]$ is constant at, for example, any time t regardless of a time point, and (2) an autocovariance $C\ (v_t,\ v_{t+k})$ is dependent only on a time difference k may be data having a stationarity.

Figure 1:
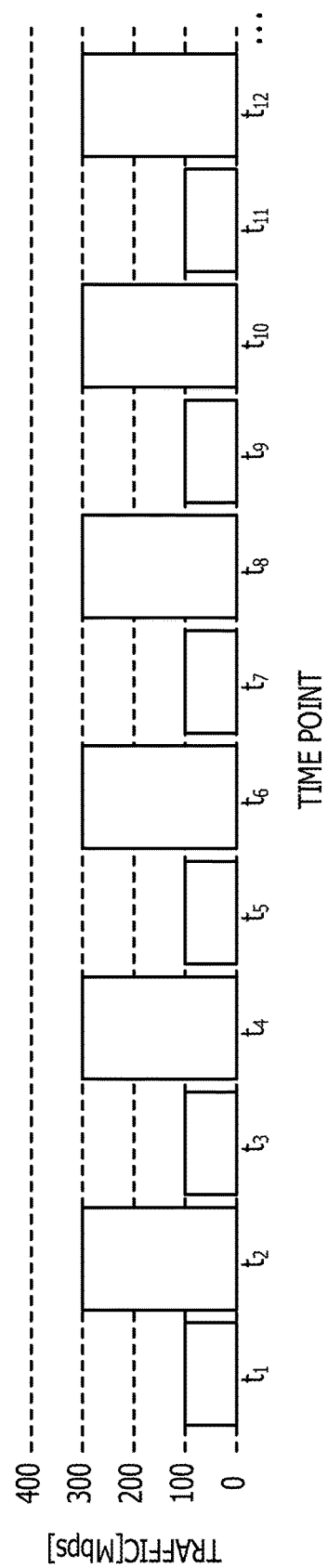
FIG. 1 illustrates an example of traffic having a stationarity.

FIG. 1 illustrates an example of traffic having a stationarity. In FIG. 1, time-series data of traffic (unit: megabit per second (Mbps)) from time points $t_1$ to $t_{12}$ are illustrated. In FIG. 1, the traffic repeatedly changes from 100 Mbps to 300 Mbps, and from 300 Mbps to 100 Mbps.

For example, a simple moving average is used for calculation of a predicted value. At a time point $t_{12}$, a simple average of traffic from time points $t_8$ to $t_{12}$ is calculated as a predicted value of traffic at a time point $t_{13}$, and the predicted value of the traffic becomes 220 Mbps. For example, in a case where the traffic at the time point $t_{13}$ is 100 Mbps, when a simple average of the traffic from time points $t_9$ to $t_{13}$, at the time point $t_{13}$, is calculated as a predicted value for traffic at a time point $t_{14}$, the predicted value of the traffic becomes 180 Mbps. When a predicted value for $t_{15}$ or a later time point is also calculated by the simple moving average in the same manner, a predicted value of traffic may be 180 Mbps or 220 Mbps, and an actual traffic variation may not be accurately predicted.

In the prediction of the traffic having a stationarity, a method other than the simple moving average, for example, a weighted average may be used. In a case where weighted average is used, when the weight is not properly set, the predicted value may not be calculated with a high accuracy.

In the following, a weighted moving average is used for calculating a predicted value, and also an autocorrelation coefficient is used for calculating the weight of the weighted moving average. Therefore, the predicted value may be accurately calculated.

Figure 2:
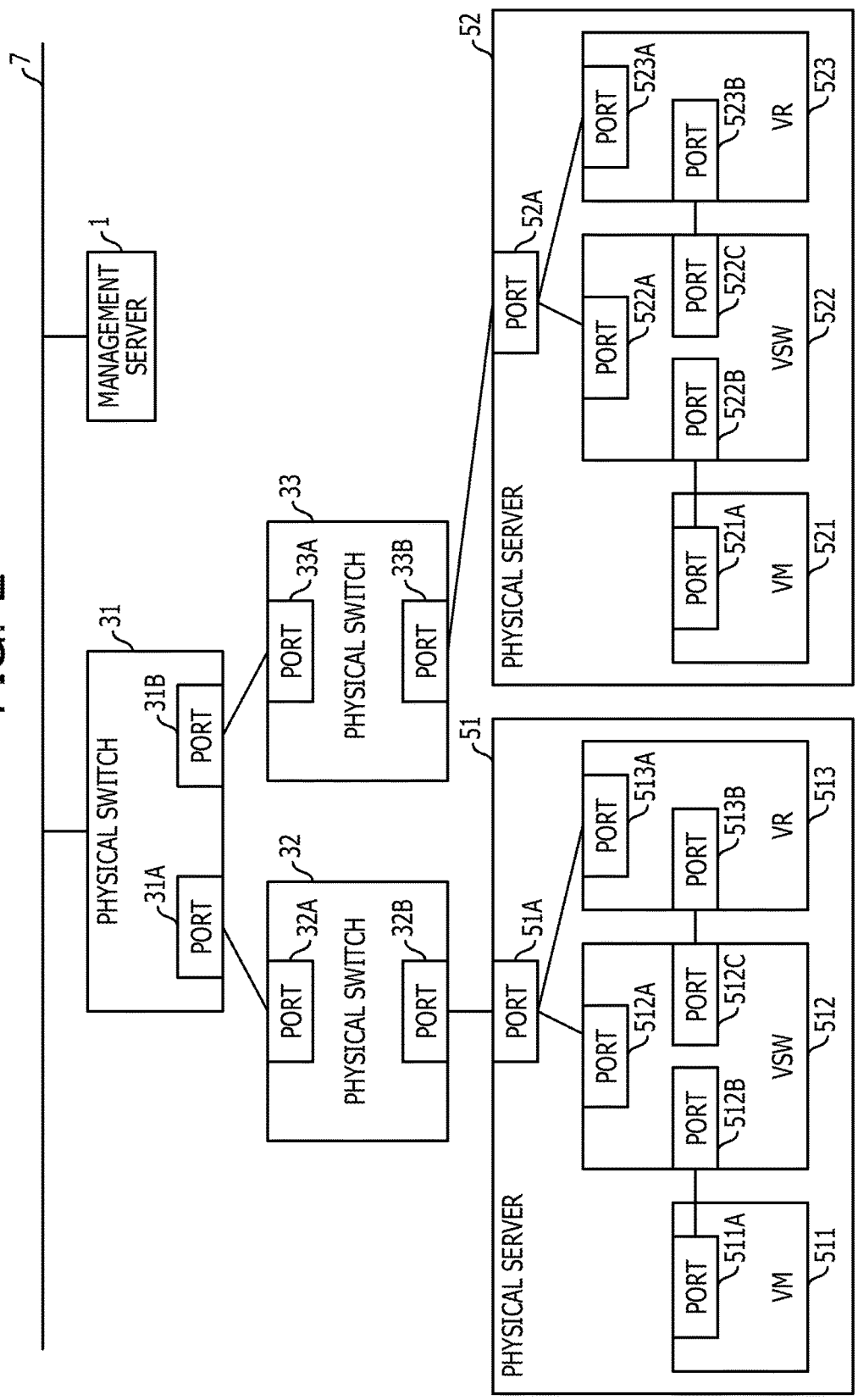
FIG. 2 illustrates an example of a system.

FIG. 2 illustrates an example of a system. A management server 1 configured to execute a main processing is coupled to a management LAN 7 which is a local area network (LAN) for management.

A physical switch 31 is coupled to the management LAN 7, and the physical switch 31 has ports 31A and 31B. A physical switch 32 has ports 32A and 32B, and the physical switch 32 and the physical switch 31 are coupled to each other via a link coupling the port 32A to the port 31A.

A physical switch 33 has ports 33A and 33B, and the physical switch 33 and the physical switch 31 are coupled to each other via a link coupling the port 33A to the port 31B.

A physical server 51 has a port 51A, and executes a virtual machine (VM) 511, a virtual switch (VSW) 512, and a virtual router (VR) 513. The physical server 51 is coupled to the physical switch 32 via a link coupling the port 51 A to the port 32B. The VM 511 has a port, for example, a virtual port 511A, the VSW 512 has ports, for example, virtual ports 512A to 512C, and the VR 513 has ports, for example, virtual ports 513A and 513B.

A physical server 52 has a port 52A, and executes a VM 521, a VSW 522, and a VR 523. The physical server 52 is coupled to the physical switch 33 via a link copling the port 52A to the port 33B. The VM 521 has a port, for example, a virtual port 521A, the VSW 522 has ports, for example, virtual ports 522A to 522C, and the VR 523 has ports for example, virtual ports 523A and 523B.

In FIG. 2, the management server 1 and the physical switch 31 are coupled to the management LAN 7, but a physical switch and a physical server other than the management server 1 and the physical switch 31 may be coupled to the management LAN 7. In the system illustrated in FIG. 2, a physical switch is used as a relay device, but a physical router may be used as the relay device.

Figure 3:
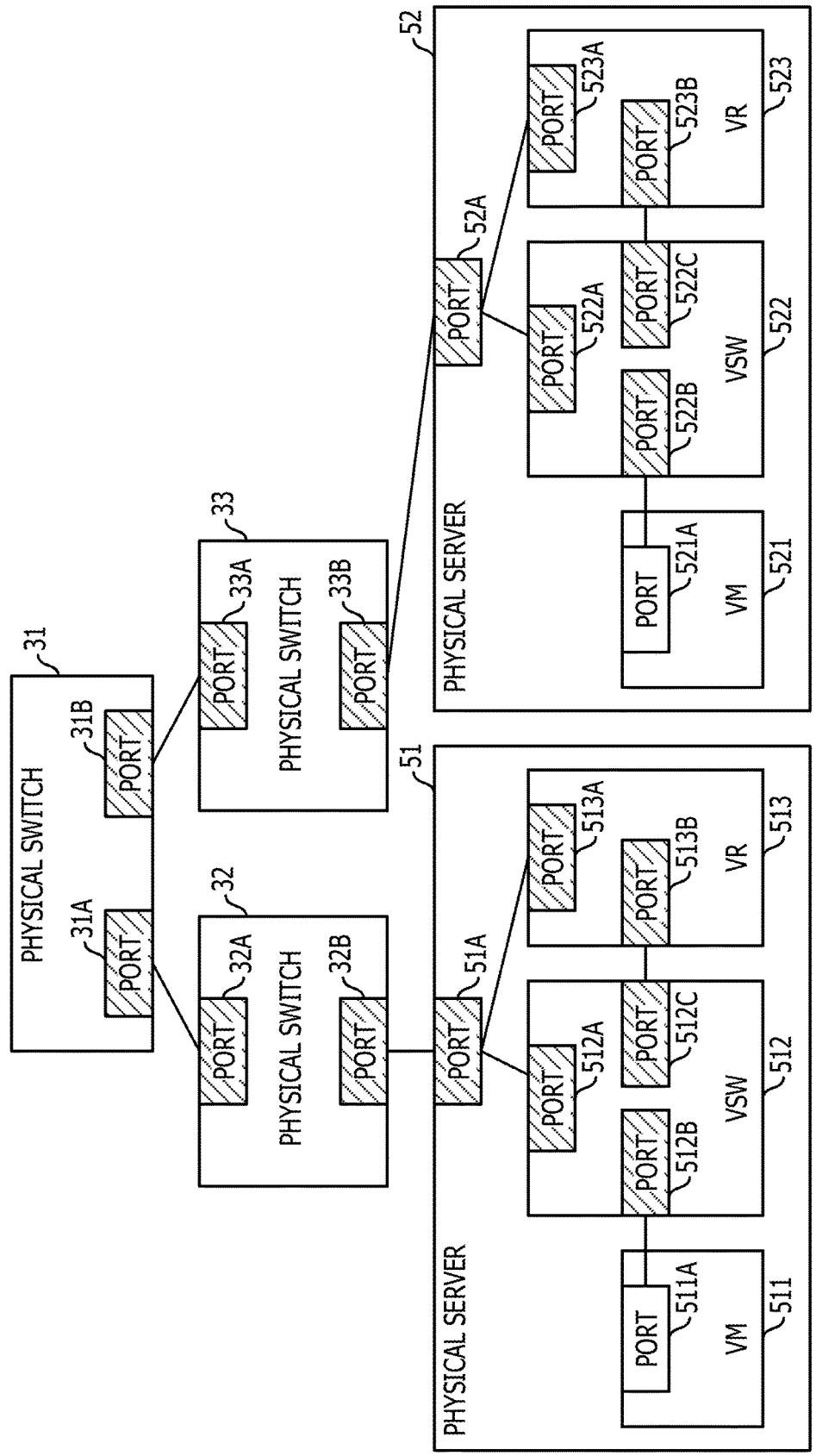
FIG. 3 illustrates an example of targets to be monitored.

The traffic in the ports other than the port 511A of the VM 511 and the port 521A of the VM 521 is monitored by the management server 1. FIG. 3 illustrates an example of targets to be monitored. As illustrated in FIG. 3, the management server 1 monitors the ports 31A and 31B, the ports 32A and 32B, the ports 33A and 33B, the port 51A, the ports 512A to 512C, the ports 513A and 513B, the port 52A, the ports 522A to 522C, and the ports 523A and 523B.

Figure 4:
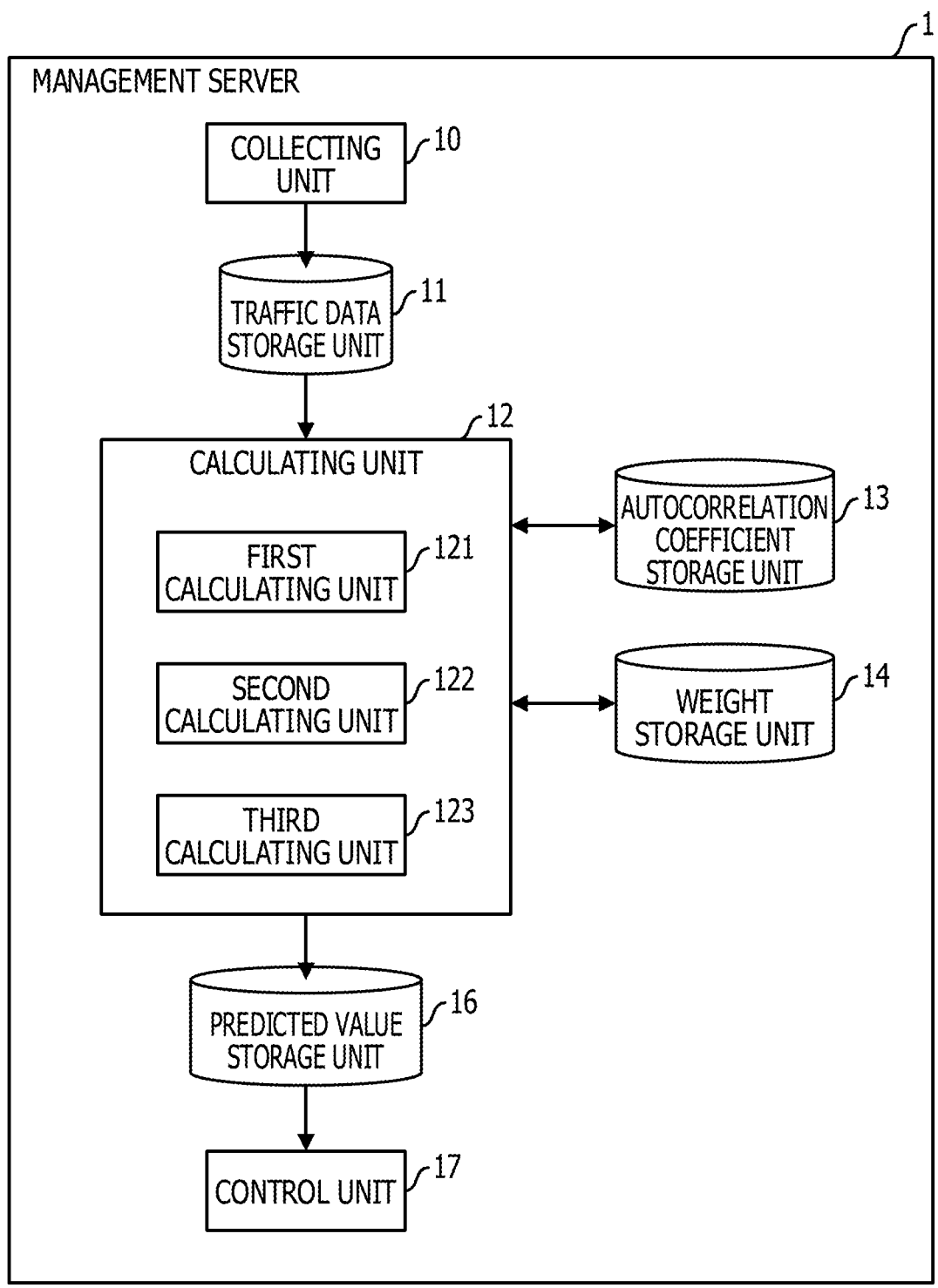
FIG. 4 illustrates an example of a functional block of a management server.

FIG. 4 illustrates an example of a functional block of a management server. The management server 1 includes a collecting unit 10, a traffic data storage unit 11, a calculating unit 12, an autocorrelation coefficient storage unit 13, a weight storage unit 14, a predicted value storage unit 16, and a control unit 17. The calculating unit 12 includes a first calculating unit 121, a second calculating unit 122, and a third calculating unit 123.

The collecting unit 10 collects traffic data from a port as a monitoring target, periodically such as, for example, every 10 seconds, and stores the collected traffic data in the traffic data storage unit 11. The first calculating unit 121 of the calculating unit 12 calculates an autocorrelation coefficient using the traffic data stored in the traffic data storage unit 11, and stores the autocorrelation coefficient in the autocorrelation coefficient storage unit 13. The second calculating unit 122 of the calculating unit 12 calculates a weight of a weighted average based on the autocorrelation coefficient stored in the autocorrelation coefficient storage unit 13, and stores the weight in the weight storage unit 14. The third calculating unit 123 of the calculating unit 12 calculates a predicted value of traffic based on the traffic data stored in the traffic data storage unit 11, the autocorrelation coefficient stored in the autocorrelation coefficient storage unit 13, and the weight stored in the weight storage unit 14, and stores the calculated value in the predicted value storage unit 16. The control unit 17 controls the migration of a virtual object based on the predicted value stored in the predicted value storage unit 16.

FIG. 5 illustrates an example of data of the traffic data storage unit. In FIG. 5, a traffic value for each time point is stored. In the traffic data storage unit 11, the traffic value for each port to be monitored is stored at each time point.

Figure 6:
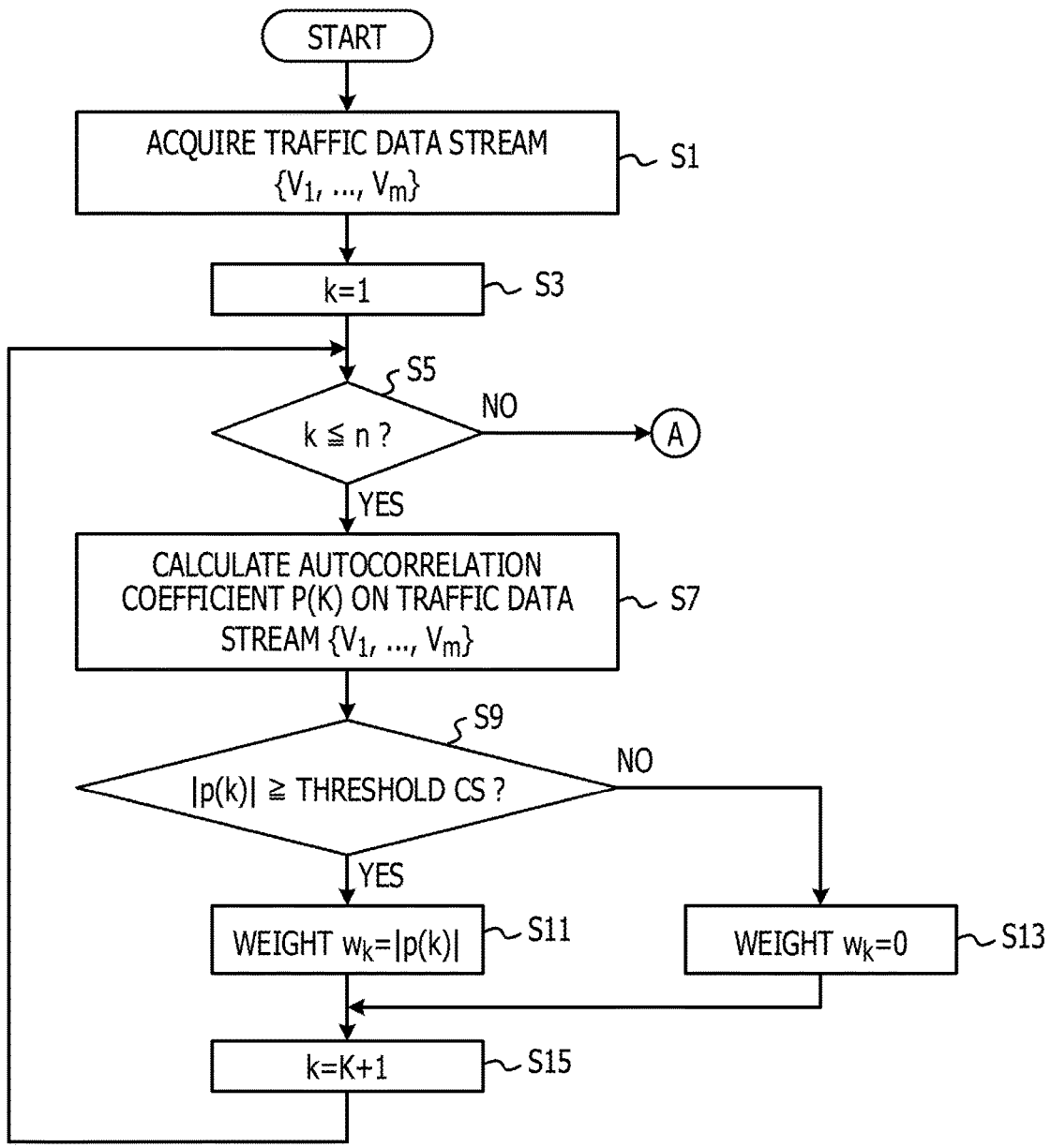
FIG. 6 illustrates an example of a process of the management server.

FIG. 6 illustrates an example of a process to be executed by a management server. In order to simplify the explanation, for example, a predicted value for a specific one port may be calculated.

The first calculating unit 121 in the management server 1 acquires a traffic data stream $\{v_1, \ldots, v_{m-i}, v_m\}$ for the specific port from the traffic data storage unit 11 (FIG. 6: operation S1). The symbol m is a variable indicating the length of a traffic data stream, and the symbol $v_m$ is a latest traffic value. The value of m may be set in advance by an administrator. When the value of m is increased, the average is calculated for a longer period.

The first calculating unit 121 sets k (which is a variable indicating a lag) to 1 (operation S3), and determines whether k<n is satisfied (operation S5). The symbol n is a variable indicating the maximum value of a lag k, and may be set in advance by an administrator such that n<m.

When k<n is satisfied (operation S5: Yes route), the first calculating unit 121 calculates an autocorrelation coefficient p(k) on the traffic data stream $\{v_1, \ldots, v_m\}$ (operation S7), and stores the calculated autocorrelation coefficient in the autocorrelation coefficient storage unit 13. When the lag is k, an autocorrelation coefficient p(k) is calculated from traffic data streams $\{v_1, \ldots, v_{m-k}\}$ and $\{v_{k+1}, \ldots, v_m\}$ by the following equation.

$$p(k) = \frac{((v_1 - \text{avg}(v))(v_{k+1} - \text{avg}(v)) + \ldots + (v_{m-k} - \text{avg}(v))(v_m - \text{avg}(v)))}{((v_1 - \text{avg}(v))^2 + \ldots + (v_m - \text{avg}(v))^2)}$$

An avg(v) indicates an average value of a traffic data stream $\{v_1, \ldots, v_m\}$, and k indicates a lag. The calculated p(k) satisfies $-1 \leq p(k) \leq 1$.

Figure 7:
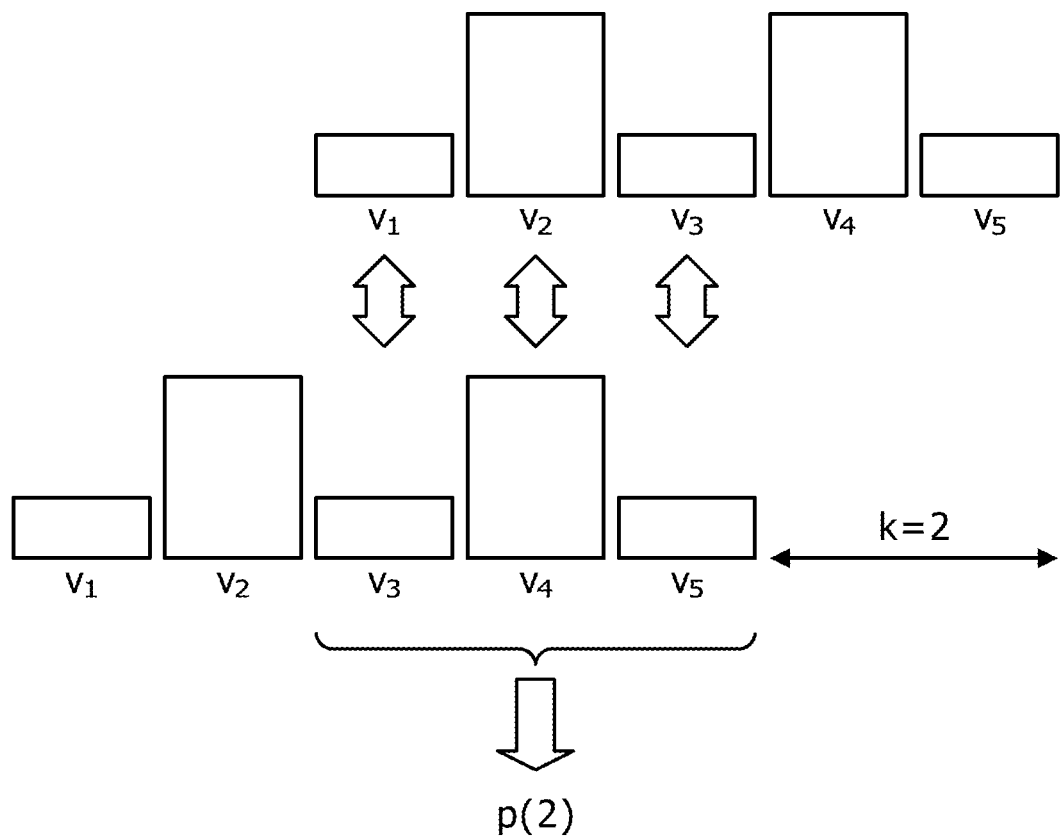
FIG. 7 illustrates an example of calculation of an autocorrelation coefficient.

FIG. 7 illustrates an example of calculation of an autocorrelation coefficient. In FIG. 7, m may be 5, and k may be 2. In this case, p(2) is calculated from a traffic data stream $\{v_1, v_2, v_3\}$ and a traffic data stream $\{v_3, v_4, v_5\}$. When k=3, p(3) is calculated from a traffic data stream $\{v_1, v_2\}$ and a traffic data stream $\{v_4, v_5\}$.

Figure 8:
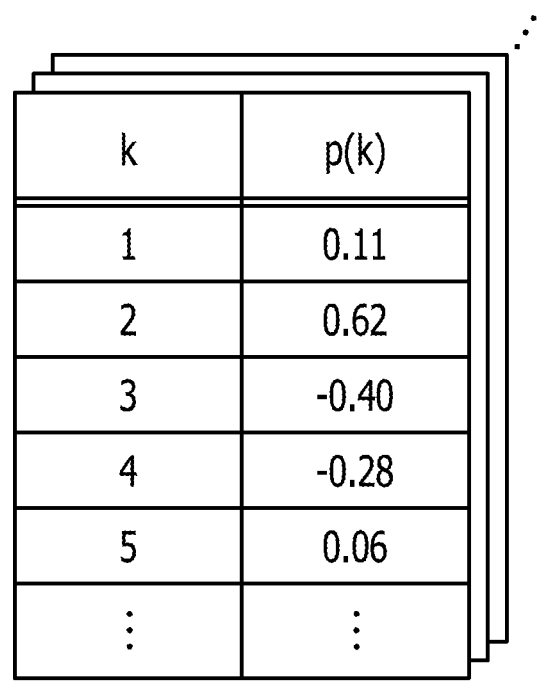

FIG. 8 illustrates an example of data of the autocorrelation coefficient storage unit. In FIG. 8, the data stored in the autocorrelation coefficient storage unit 13 are illustrated. In FIG. 8, an autocorrelation coefficient p(k) is stored for each value of k. In the autocorrelation coefficient storage unit 13, the value of p(k) for each value of k in each port as a monitoring target is stored.

In FIG. 6, the second calculating unit 122 determines whether $|p(k)| \leq CS$ is satisfied (operation S9). The symbol CS is a threshold of an autocorrelation coefficient, and may be set to, for example, 0.6. When $|p(k)| \geq CS$ is satisfied (operation S9: Yes route), the second calculating unit 122 sets a weight $w_k$ to $|p(k)|$ ($w_k = |p(k)|$) (operation S11), and stores the weight $w_k$ in the weight storage unit 14. When

|p(k)|≥CS is not satisfied (operation S9: No route), the second calculating unit 122 sets a weight $w_k$ to 0 ($w_k=0$|) (operation S13), and stores the weight $w_k$ in the weight storage unit 14.

Figure 9:
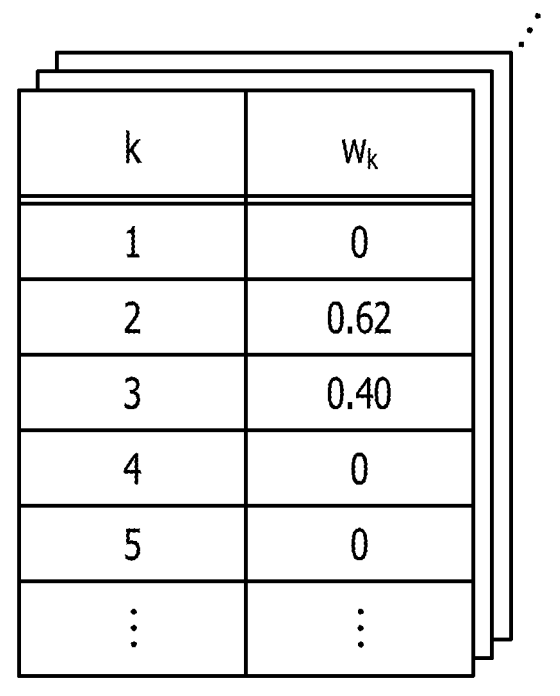

FIG. 9 illustrates an example of data in a weight storage unit. In FIG. 9, data stored in the weight storage unit 14 are illustrated. In FIG. 9, a weight $w_k$ is stored for each value of k. In the weight storage unit 14, a value of $w_k$ for each value of k in each port as a monitoring target is stored.

The second calculating unit 122 increases a lag k by 1 (operation S15). The process returns to operation S5.

Figure 10:
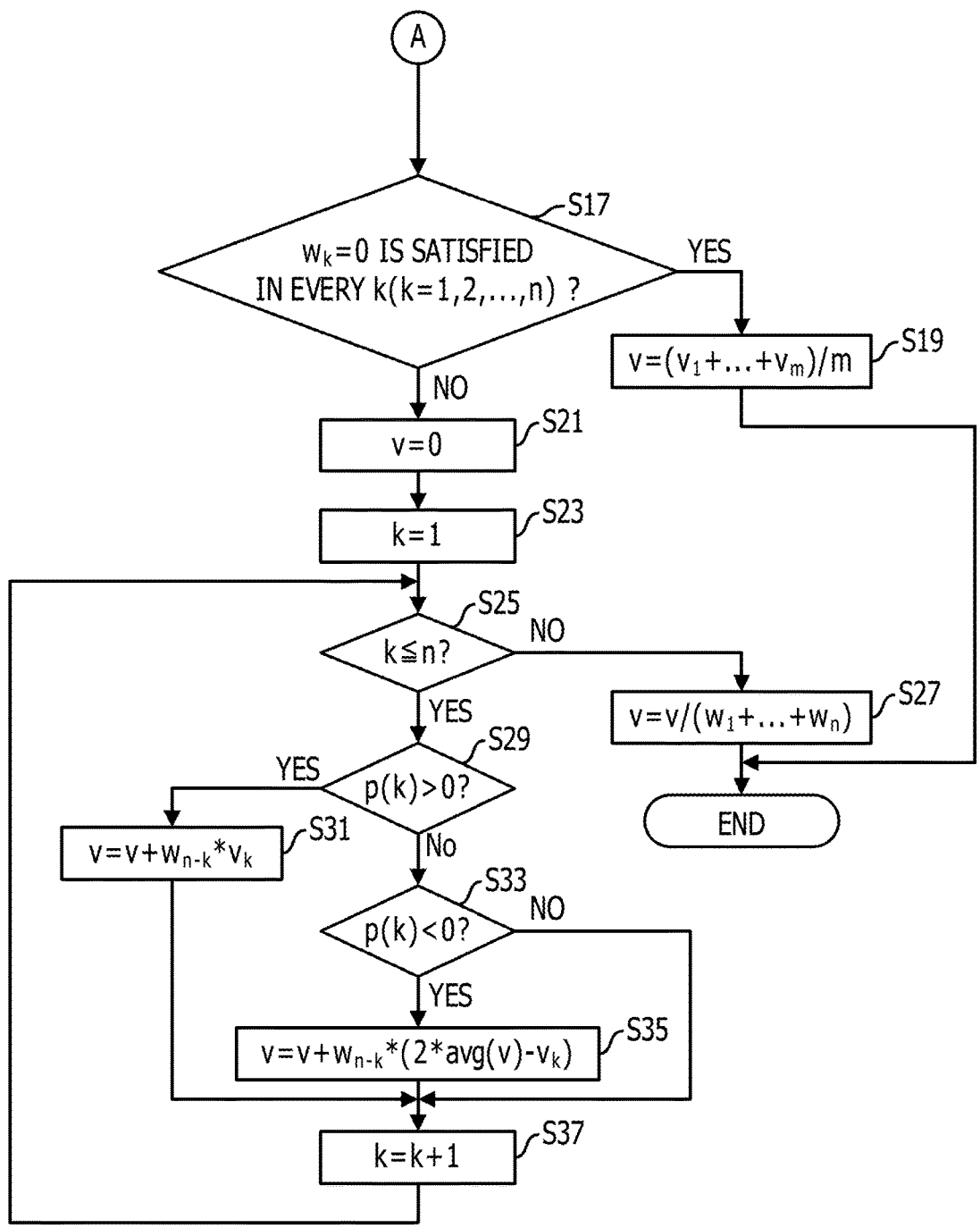
FIG. 10 illustrates an example of a process to be executed by the management server.

When k<n is not satisfied (operation S5: No route), the process proceeds to operation S17 illustrated in FIG. 10 via a terminal A. FIG. 10 illustrates an example of a process to be executed by the management server.

The third calculating unit 123 determines whether $w_k=0$ is satisfied in all k (k=1, 2, . . . , n) (operation S17). When $w_k=0$ is satisfied in all k (k=1, 2, . . . , n) (operation S17: Yes route), the third calculating unit 123 calculates a predicted value v by $v=(v_1+ \ldots +v_m)m$ (operation S19), and stores the calculated predicted value in the predicted value storage unit 16. For example, the predicted value v is calculated by a simple average. The process is ended.

When $w_k=0$ is not satisfied in at least one of all k (k=1, 2, . . . , n) (operation S17: No route), the third calculating unit 123 sets a predicted value v to 0 (v=0, operation S21).

The third calculating unit 123 sets a variable k indicating a lag to 1 (k=1) (operation S23), and determines whether k<n is satisfied (operation S25). When k≤n is satisfied (operation S25: Yes route), the third calculating unit 123 determines whether p(k)>0 is satisfied (operation S29).

When p(k)>0 is satisfied (operation S29: Yes route), the third calculating unit 123 sets a predicted value v to $v+w_{n-k}*v_k$ ($v=v+w_{n-k}*v_k$) (operation S31). The process proceeds to operation S37.

Figure 11:
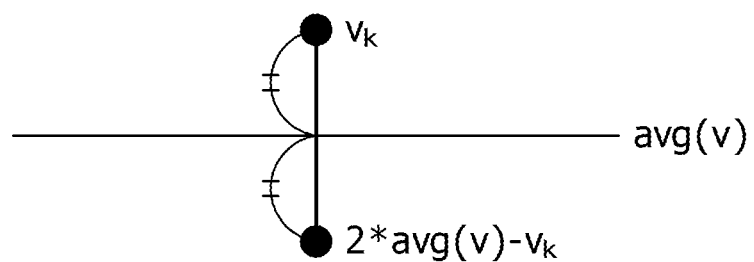
FIG. 11 illustrates an example of a process when an autocorrelation coefficient is negative.

When p(k)>0 is not satisfied (operation S29: No route), the third calculating unit 123 determines whether p(k)<0 is satisfied (operation S33). When p(k)<0 is satisfied (operation S33: Yes route), the third calculating unit 123 sets a predicted value v to $v+w_{n-k}*(2*avg(v)-v_k)$ ($v=v+w_{n-k}*(2*avg(v)-v_k)$) (operation S35). The process proceeds to operation S37. FIG. 11 illustrates an example of a process when an autocorrelation coefficient is negative. As illustrated in FIG. 11, $2*avg(v)-v_k$ is a value smaller than avg(v) by ($v_k$-avg(k)), and $v_k$ is a value larger than avg(v) by ($v_k$-avg(k)). Therefore, when the autocorrelation coefficient is negative, a smaller value is added to v, and when the autocorrelation coefficient is positive, a larger value is added to v.

When p(k)<0 is not satisfied (operation S33: No route), the third calculating unit 123 increases k by 1 (operation S37). The process returns to operation S25.

When it is determined that k<n is not satisfied (operation S25: No route), the third calculating unit 123 sets a predicted value v to $v/(w_1+ \ldots +w_n)$ (operation S27), and stores the predicted value v in the predicted value storage unit 16. This process may correspond to normalization. The process is ended.

FIG. 12 illustrates an example of data in the predicted value storage unit. In FIG. 12, in each port, a predicted value at any time point is stored. Whenever traffic data at a new time point are stored in the traffic data storage unit 11, the calculating unit 12 performs a processing, and updates the predicted value stored in the predicted value storage unit 16.

When the autocorrelation coefficient is calculated as described above, the autocorrelation coefficient indicates the degree of similarity between a traffic data stream and a data stream obtained by time-shifting the traffic data stream. Since the weight of the weighted average is calculated based on the autocorrelation coefficient, an affect of a data stream whose degree of similarity to an original traffic data stream is high may be strongly obtained. On traffic with a stationarity, a predicted value may be calculated with a higher accuracy. For example, when an absolute value of the autocorrelation coefficient is smaller than a threshold CS, the traffic corresponding to the autocorrelation coefficient is not used for calculating a predicted value. Thus, the accuracy reduction of the predicted value may be reduced.

For example, in FIG. 1, when m=5, n=2, and CS=0.6, traffic at a time point $t_6$ may be predicted. In this case, a traffic data stream is {100, 300, 100, 300, 100}, and p(1)= –0.8, p(2)=0.6, $w_1$=0.8, and $w_2$=0.6. The predicted value v becomes $(w_1*v_5+w_2*v_4)/(w_1+w_2)=(0.8*(2*180-100)+0.6*300)/(0.8+0.6)≈277$. Therefore, the accuracy of the predicted value is improved as compared to a case where a simple average is used.

Figure 13:
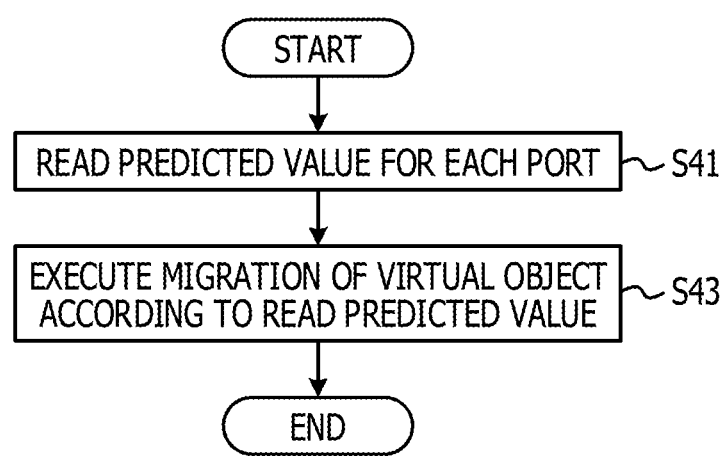
FIG. 13 illustrates an example of a control process of traffic.

FIG. 13 illustrates an example of a control process of traffic. In FIG. 13, the traffic is controlled based on a predicted value. The process illustrated in FIG. 13 may be executed each time, for example, a predicted value stored in the predicted value storage unit 16 is updated.

The control unit 17 reads a predicted value for each port from the predicted value storage unit 16 (FIG. 13: operation S41). The control unit 17 executes the migration of a virtual object according to the predicted value read in operation S41 (operation S43). The process is ended.

For example, when traffic in a certain port, for example, a port A, is extremely larger than traffic in other ports, a virtual object within a device having the port A may migrate to another device, so that the traffic in the port A may be reduced. In some cases, the migration of the virtual object may not be performed.

For example, the weight of the weighted average may be determined based on the autocorrelation coefficient calculated using a difference data stream.

Figure 14:
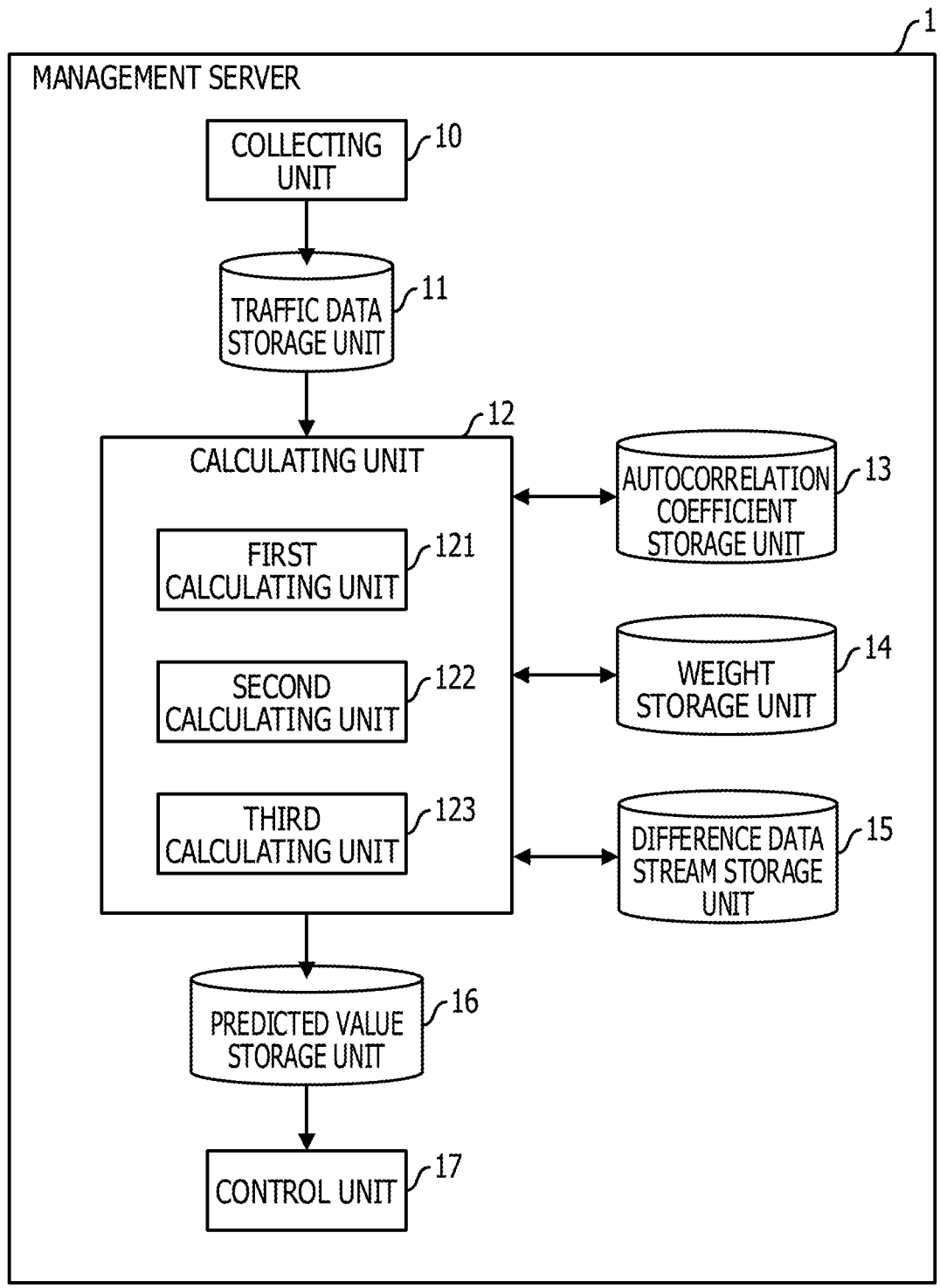
FIG. 14 illustrates an example of a function of the management server.

FIG. 14 illustrates an example of a functional block of a management server. The management server 1 includes a collecting unit 10, a traffic data storage unit 11, a calculating unit 12, an autocorrelation coefficient storage unit 13, a weight storage unit 14, a difference data stream storage unit 15, a predicted value storage unit 16, and a control unit 17. The calculating unit 12 includes a first calculating unit 121, a second calculating unit 122, and a third calculating unit 123. The management server 1 illustrated in FIG. 14 is different from the management server 1 illustrated in FIG. 4 in that the management server 1 illustrated in FIG. 14 has the difference data stream storage unit 15.

Figure 15:
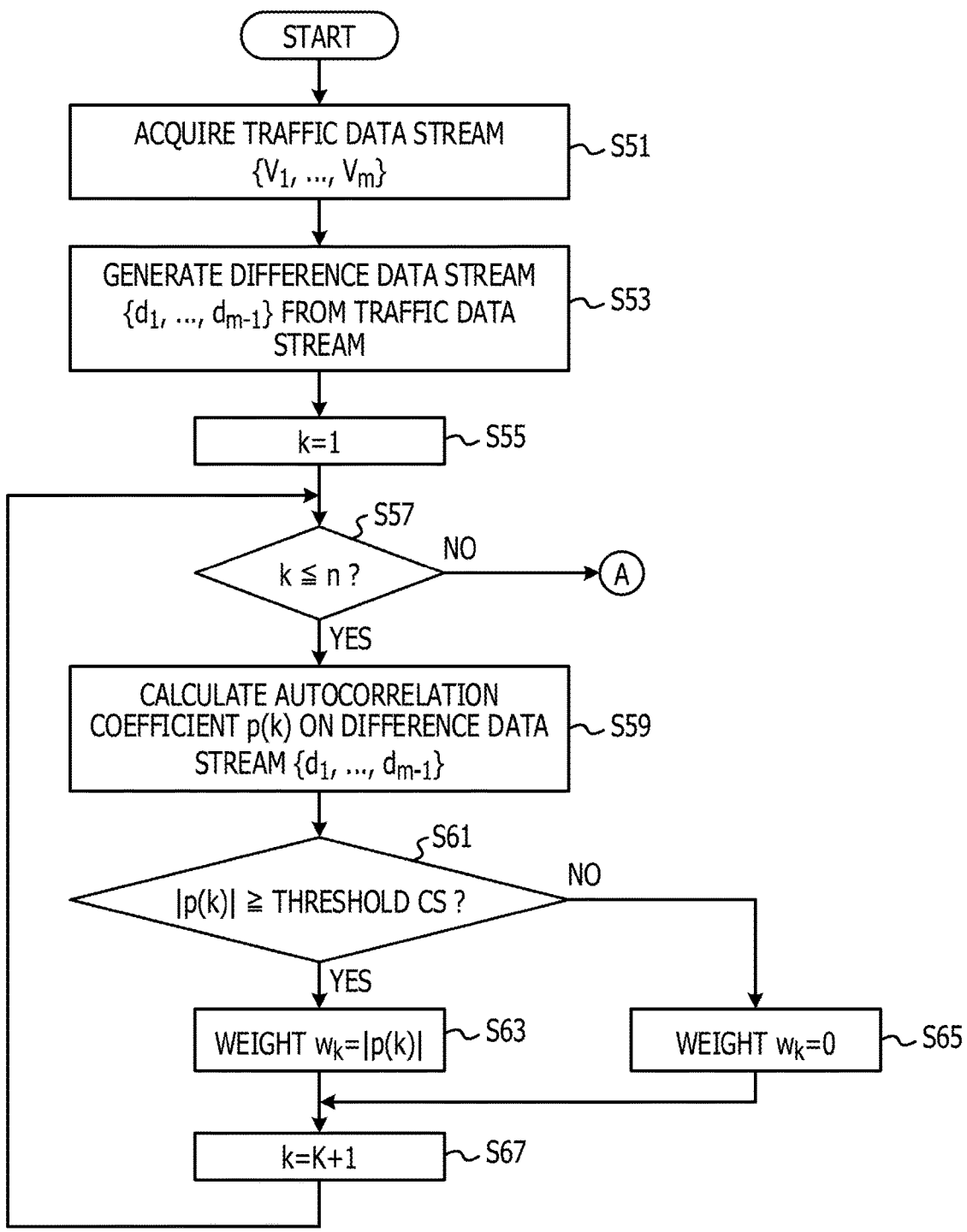
FIG. 15 illustrates an example of a process of the management server.
Figure 16:
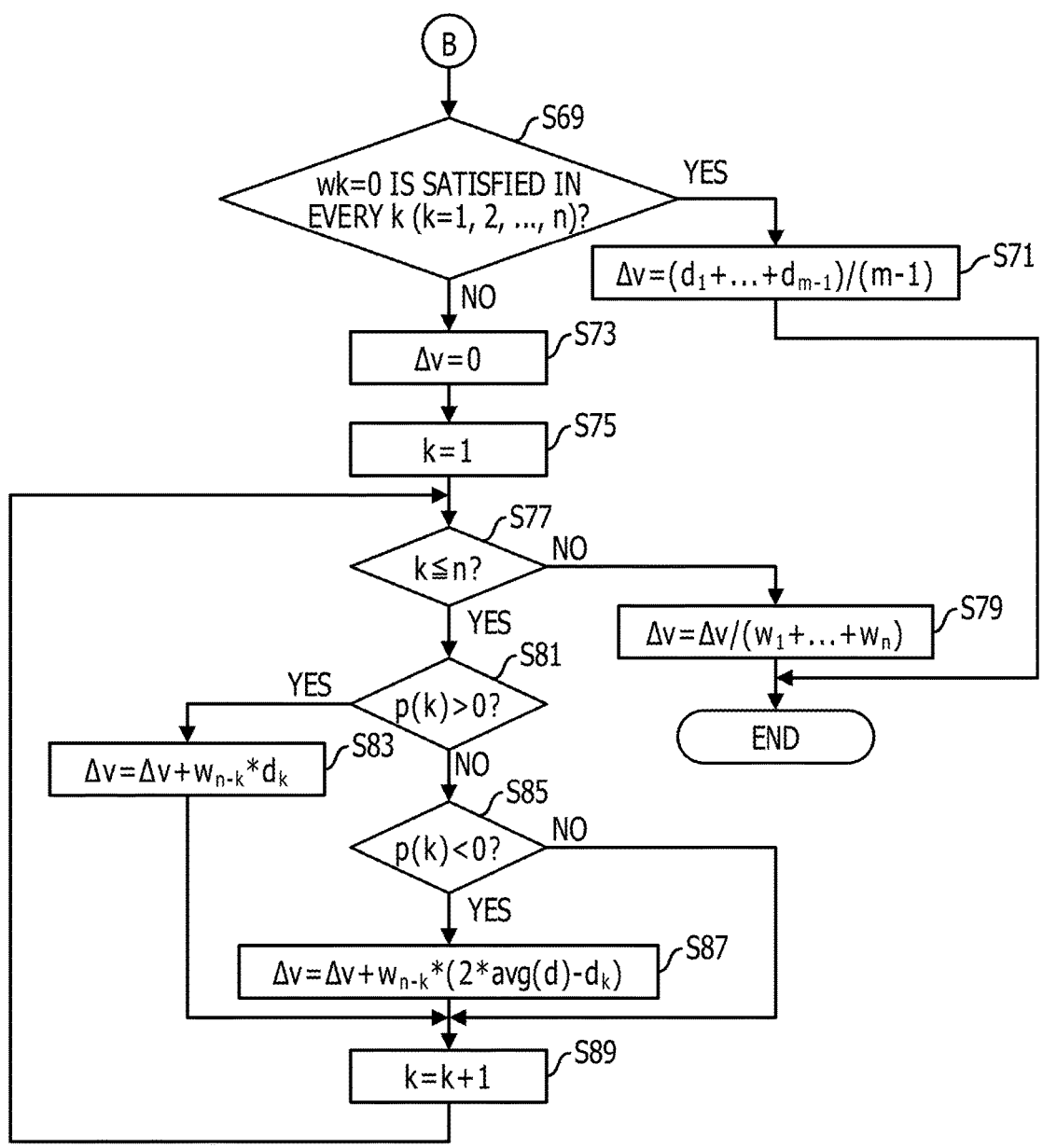
FIG. 16 illustrates an example of the process of the management server.

FIGS. 15 and 16 illustrate an example of an operation of the management server. In order to simplify the explanation, for example, a predicted value for a specific one port may be calculated.

The first calculating unit 121 of the management server 1 acquires a traffic data stream $\{v_1, \ldots, v_{m-1}, v_m\}$ for the specific port from the traffic data storage unit 11 (FIG. 15: operation S51). The symbol m is a variable indicating the length of a traffic data stream, and the symbol $v_m$ is a latest traffic value. The value of m may be set in advance by an administrator.

The first calculating unit 121 generates a difference data stream $\{d_1, \ldots, d_{m-1}\}$ from the traffic data stream acquired in operation S51 (operation S53). A difference data stream for a certain data stream $\{x_1, \ldots, x_m\}$ is $\{(x_2-x_1), \ldots, (x_m-x_{m-1})\}$.

The first calculating unit 121 sets k, which is a variable indicating a lag, to 1 (k=1) (operation S55), and determines whether k<n is satisfied (operation S57). The symbol n is a variable indicating the maximum value of a lag k, and may be set in advance by an administrator such that n<m.

When k<n is satisfied (operation S57: Yes route), the first calculating unit 121 calculates an autocorrelation coefficient p(k) on the difference data stream $\{d_1, \ldots, d_{m-1}\}$, and stores the calculated autocorrelation coefficient in the autocorrelation coefficient storage unit 13 (operation S59).

The second calculating unit 122 determines whether |p(k)|≥CS is satisfied (operation S61). The symbol CS is a threshold of an autocorrelation coefficient. When |p(k)|≥CS is satisfied (operation S61: Yes route), the second calculating unit 122 sets a weight $w_k$ to |p(k)| ($w_k$=|p(k)|) (operation S63), and stores the weight $w_k$ in the weight storage unit 14. When |p(k)|≥CS is not satisfied (operation S61: No route), the second calculating unit 122 sets a weight $w_k$ to 0 ($w_k$=0) (operation S65), and stores the weight $w_k$ in the weight storage unit 14.

The second calculating unit 122 increases a lag k by 1 (operation S67). The process returns to a processing in operation S57.

When k<n is not satisfied (operation S57: No route), the process proceeds to the processing in operation S69 illustrated in FIG. 16 via a terminal B.

In FIG. 16, the third calculating unit 123 determines whether $w_k$=0 is satisfied in all k (k=1, 2, ..., n) (FIG. 16 : operation S69). When $w_k$=0 is satisfied in all k (k=1, 2, ..., n) (operation S69 : Yes route), the third calculating unit 123 calculates Δv which indicates a difference between a predicted value v and $v_m$ by Δv=($d_1$+...+$d_{m-1}$)/(m-1) (operation S71), and stores the predicted value v=$v_m$+Δv in the predicted value storage unit 16. For example, Δv is calculated by a simple average. The process is ended.

When $w_k$=0 is not satisfied in at least one of all k (k=1, 2, ..., n) (operation S69: No route), the third calculating unit 123 sets Δv to 0 (Δv=0) (operation S73).

The third calculating unit 123 sets a variable k indicating a lag to 1 (k=1) (operation S75), and determines whether k<n is satisfied (operation S77). When k<n is satisfied (operation S77: Yes route), the third calculating unit 123 determines whether p(k)>0 is satisfied (operation S81).

When p(k)>0 is satisfied (operation S81: Yes route), the third calculating unit 123 sets Δv to Δv+$w_{n-k}$*$d_k$ (Δv=Δv+$w_{n-k}$*$d_k$) (operation S83). The process proceeds to operation S89.

When p(k)>0 is not satisfied (operation S81: No route), the third calculating unit 123 determines whether p(k)<0 is satisfied (operation S85). When p(k)<0 is satisfied (operation S85: Yes route), the third calculating unit 123 sets Δv to Δv+$w_{n-k}$*(2*avg(d)-$d_k$) (Δv=Δv+$w_{n-k}$*(2*avg(d)-$d_k$)) (operation S87). The process proceeds to operation S89. The avg(d) represents an average of a difference data stream $\{d_1, \ldots, d_{m-1}\}$.

When p(k)<0 is not satisfied (operation S85: No route), the third calculating unit 123 increases k by 1 (operation S89). The process returns to operation S77.

When it is determined that k<n is not satisfied (operation S77: No route), the third calculating unit 123 sets Δv to Δv/($w_1$+ ... +$w_n$) (Δv=Δv/($w_1$+ ... +$w_n$)) (operation S79), and stores the predicted value v=$v_m$+Δv in the predicted value storage unit 16. This process may correspond to normalization. The process is ended.

Even though the traffic data stream does not have a stationarity, the difference data stream may have a stationarity. Therefore, by using the stationarity of the difference data stream, the predicted value may be calculated with a high accuracy.

For example, in FIG. 1, when m=5, n=2, and CS=0.6, the traffic at a time point $t_6$ may be predicted. In this case, a difference data stream is {200, -200, 200, -200}, and p(1)=-0.8, p(2)=0.5, $w_1$=0.8, and $w_2$=0. The predicted value v becomes $v_5$+($w_1$*$d_4$+$w_2$*$d_3$)/($w_1$+$w_2$)=100+(0.8*(2*0-(-200))+0*200)/(0.8)=300. Therefore, the accuracy of the predicted value may be improved as compared to a case where a simple average is used.

Figure 17:
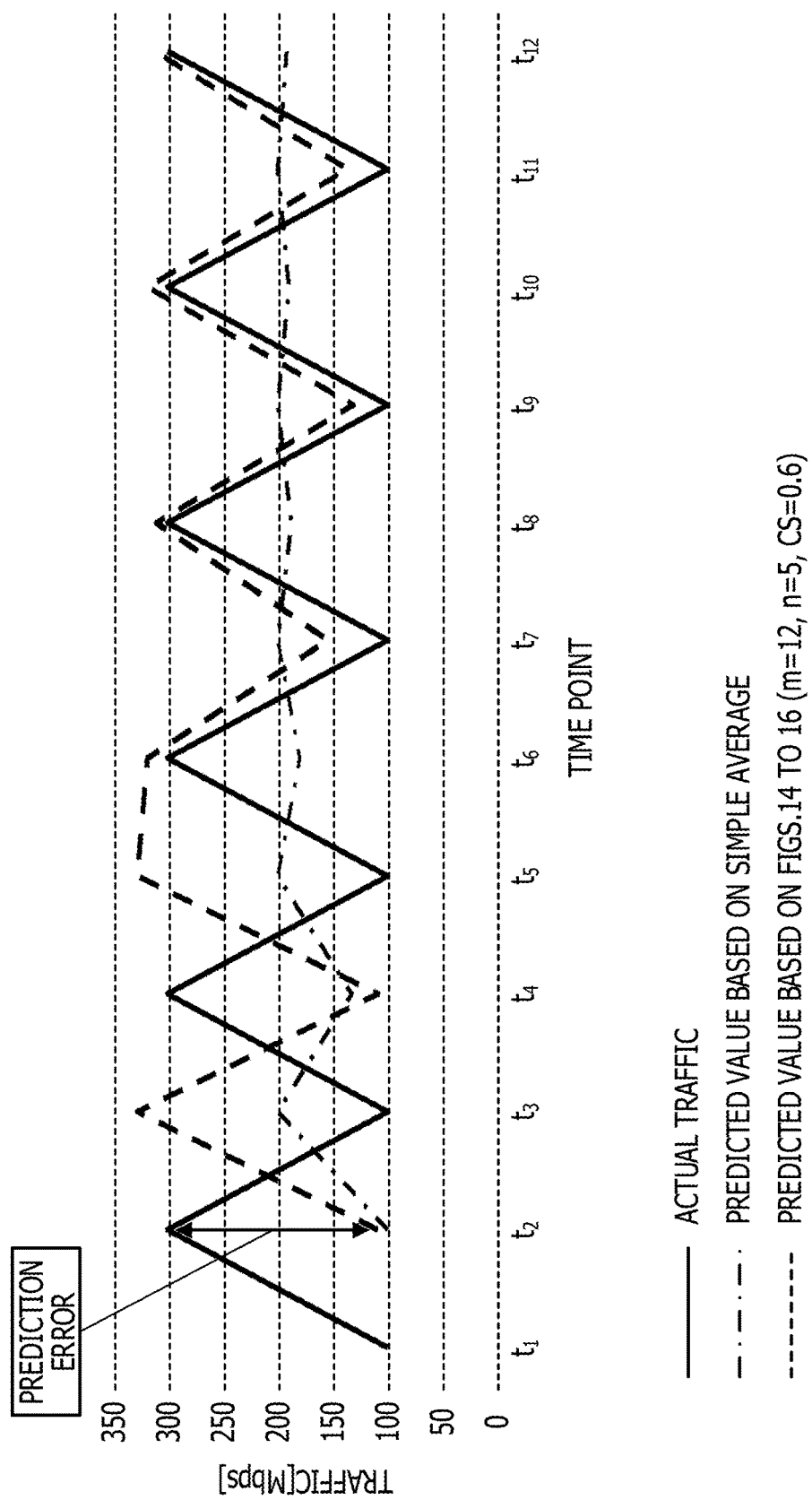
FIG. 17 illustrates an example of an error between a predicted value and an actual traffic.
Figure 18:
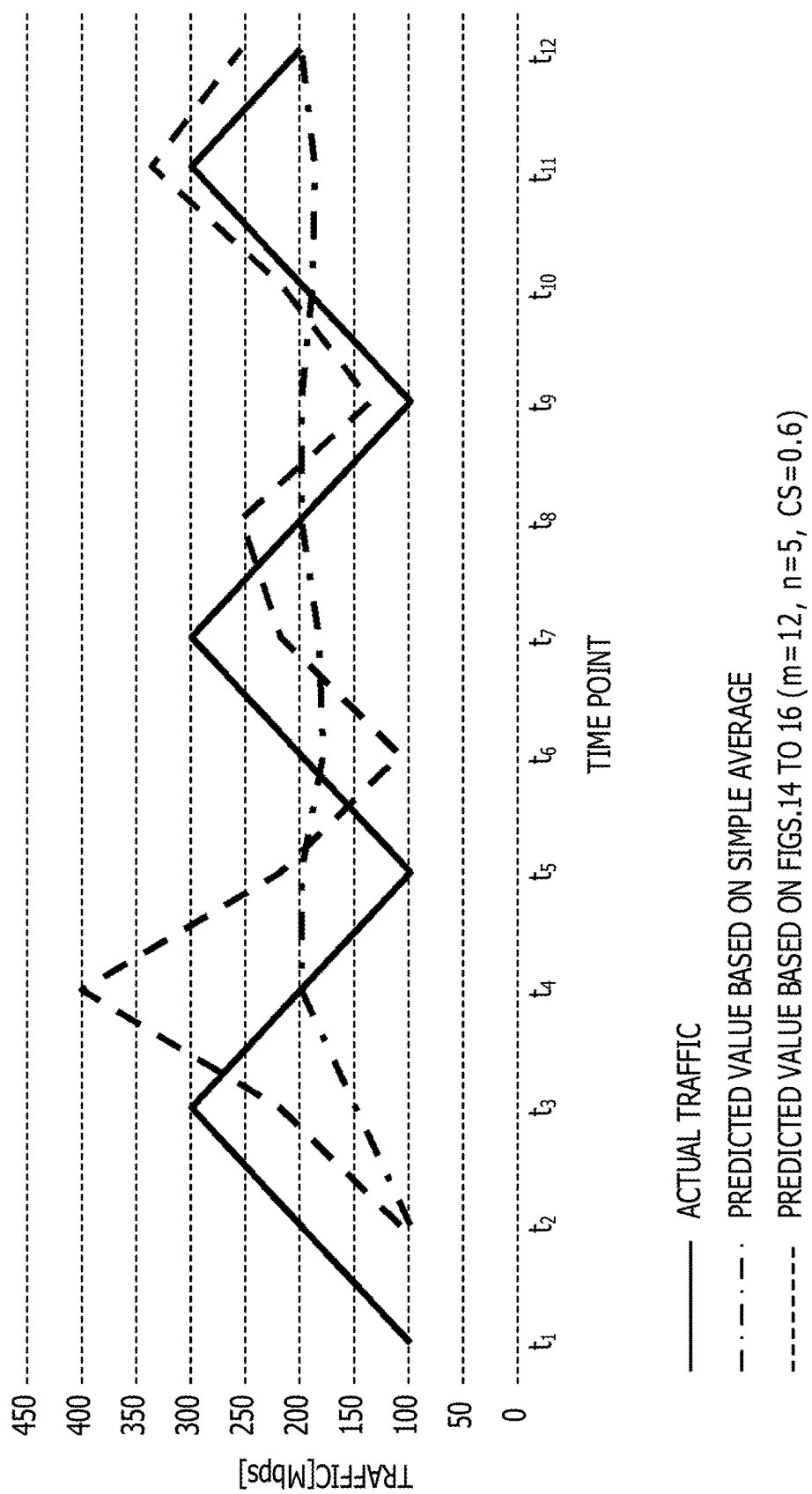
FIG. 18 illustrates an example of an error between a predicted value and an actual traffic.
Figure 19:
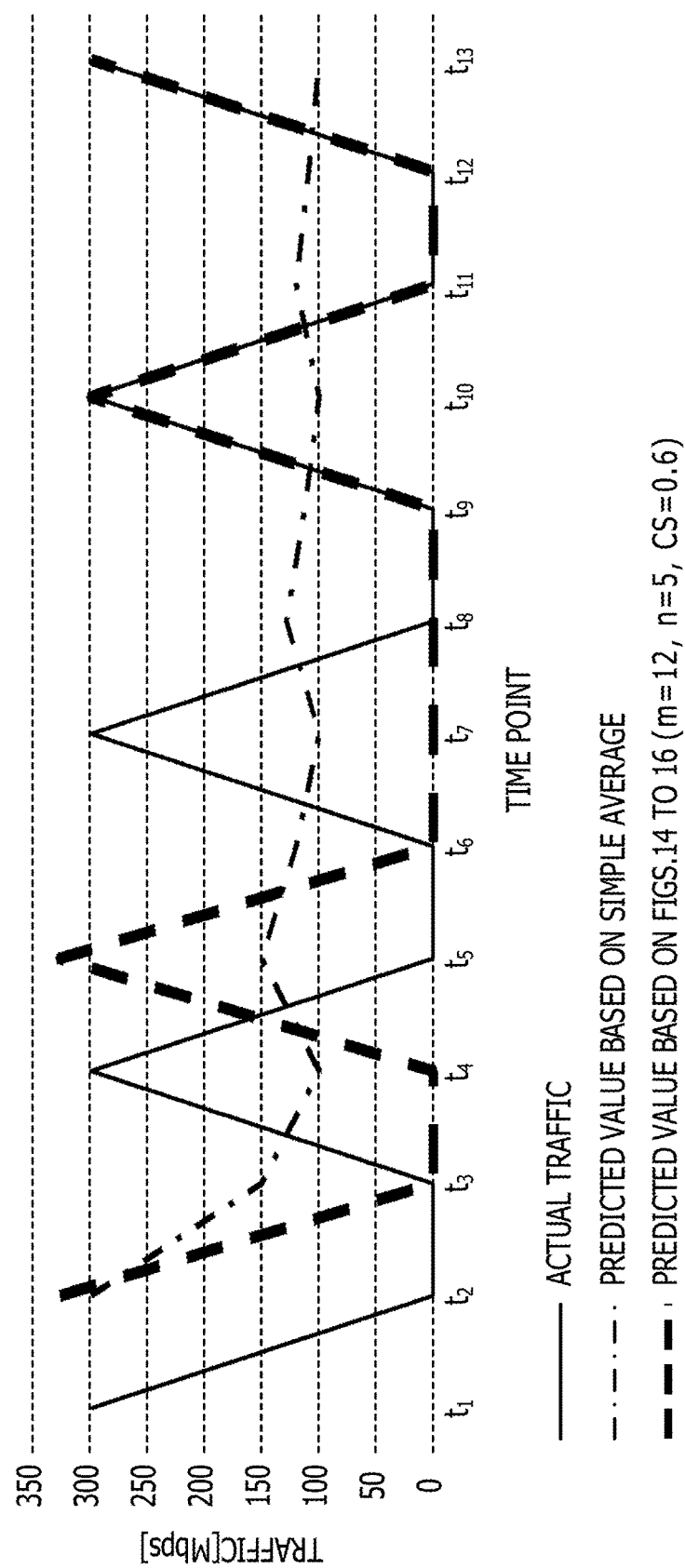
FIG. 19 illustrates an example of an error between a predicted value and an actual traffic.

FIGS. 17 to 19 illustrate an example of an error between a predicted value and an actual traffic.

In FIG. 17, a first example of a variation of traffic is illustrated. In FIG. 17, the solid line represents an actual value of the traffic, the one-dot chain line represents a predicted value based on a simple average, and the broken line represents a predicted value based on FIGS. 14 to 16 (for example, when m=12, n=5, CS=0.6).

The actual traffic repeatedly changes from 100 Mbps to 300 Mbps, and from 300 Mbps to 100 Mbps. The predicted value based on a simple average becomes a value between 100 Mbps and 200 Mbps, and converges on 200 Mbps with the elapse of time. In the predicted value based on FIGS. 14 to 16, a prediction error is relatively large until a time point $t_5$, but becomes relatively small after the time point $t_6$.

In FIG. 18, a second example of a variation of traffic is illustrated. In FIG. 18, the solid line represents an actual value of the traffic, the one-dot chain line represents a predicted value based on a simple average, and the broken line represents a predicted value based on FIGS. 14 to 16 (for example, when m=12, n=5, CS=0.6).

The actual traffic repeatedly changes from 100 Mbps to 200 Mbps, from 200 Mbps to 300 Mbps, from 300 Mbps to 200 Mbps, and from 200 Mbps to 100 Mbps. The predicted value based on a simple average becomes a value between 100 Mbps and 200 Mbps, and converges on 200 Mbps with the elapse of time. In the predicted value based on FIGS. 14 to 16, a prediction error is relatively large until a time point $t_7$, and reaches 200 Mbps at a time point $t_4$. Then, after a time point $t_8$, the prediction error becomes relatively small.

In FIG. 19, a third example of a variation of traffic is illustrated. In FIG. 19, the solid line represents an actual value of the traffic, the one-dot chain line represents a predicted value based on a simple average, and the broken line represents a predicted value based on FIGS. 14 to 16 (for example, when m=12, n=5, CS=0.6).

The actual traffic repeatedly changes by sequentially becoming 300 Mbps, becoming 0 Mbps, maintaining one interval of 0 Mbps, and returning to 300 Mbps. The predicted value based on a simple average gradually decreases until a time point $t_4$, becomes a value between 100 Mbps and 150 Mbps after the time point $t_4$, and converges on 100 Mbps with the elapse of time. In the predicted value based on FIGS. 14 to 16, a prediction error is relatively large until a time point $t_7$, and reaches 300 Mbps at time points $t_2$, $t_4$, $t_5$, and $t_7$. After a time point $t_8$, the prediction error disappears.

In the predicted value based on FIGS. 14 to 16, the accuracy of the predicted value on the traffic having a stationarity may increase with elapse of time.

Although one exemplary embodiment of the present disclosure has been described, the present disclosure is not limited thereto. For example, the functional block configuration of the management server 1 described above may not coincide with an actual program module configuration.

In the process flow described above, the sequence in the process may be changed and a parallel execution may be carried out, as long as the processing result is not changed.

A process using a traffic data stream, for example, a process illustrated in FIGS. 6 and 10, and a process using a difference data stream, for example, a process illustrated in FIGS. 15 and 16 may be separately performed, and the former and the latter processes may be performed in conjunction with each other. For example, when it is determined that $w_k=0$ in all k values (k=1, 2, . . . , n) is satisfied in operation S17, the latter process may be executed.

Figure 20:
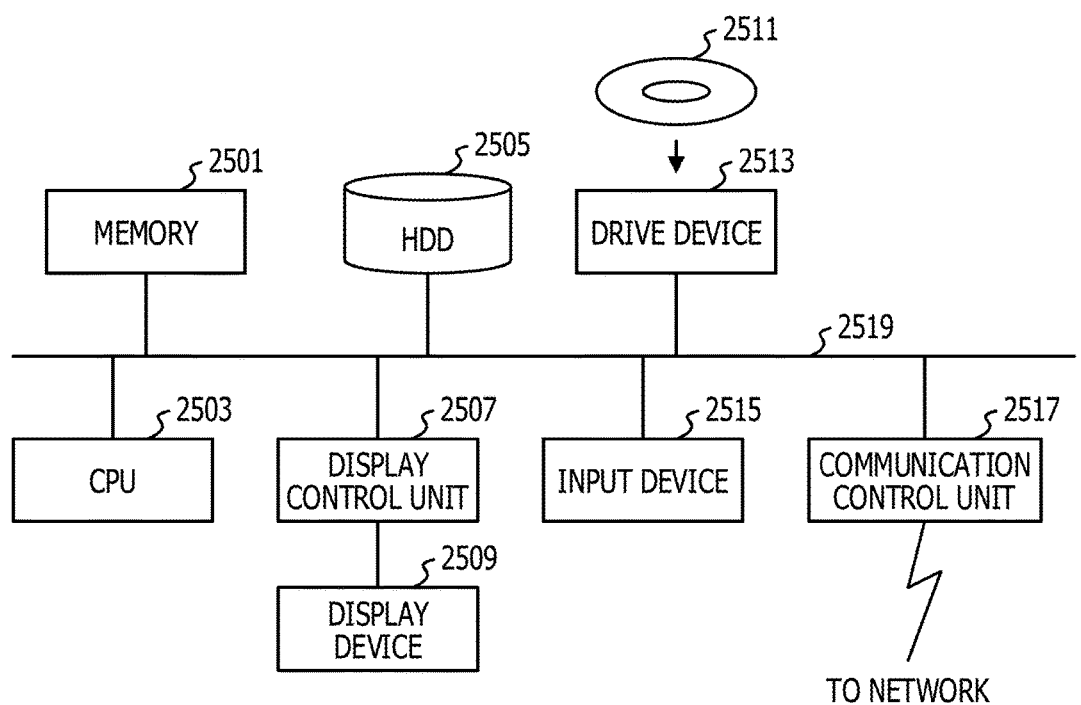
FIG. 20 illustrates an example of a functional block of a computer.

The management server 1, the physical server 51 and the physical server 52 may be computer devices. FIG. 20 illustrates an example of a functional block of a computer. As illustrated in FIG. 20, a memory 2501, a central processing unit (CPU) 2503, a hard disk drive (HDD) 2505, a display control unit 2507 coupled to a display device 2509, a drive device 2513 for a detachable disk 2511, an input device 2515, and a communication control unit 2517 for network connection are coupled through a bus 2519. An operating system (OS) and an application program for executing the process described above are stored in the HDD 2505, and are read from the HDD 2505 to the memory 2501 when executed by the CPU 2503. The CPU 2503 controls the display control unit 2507, the communication control unit 2517, and the drive device 2513 according to the processing content of the application program so as to perform a certain operation. The data during the process may be stored in the memory 2501, or in the HDD 2505. The application program for executing the process described above may be distributed while being stored in the detachable disk 2511 that is computer-readable, and may be installed from the drive device 2513 to the HDD 2505. The application program may be installed to the HDD 2505 via a network such as the Internet, and the communication control unit 2517. In the computer device, hardwares such as the CPU 2503 and the memory 2501 may organically cooperate with an OS and a program such as an application program to achieve the functions described above.

The information processing system includes a communication device and a management device for managing the communication device. The management device includes an acquisition unit configured to acquire traffic information on a port of the communication device at a plurality of time points from the communication device, a first calculating unit configured to calculate a plurality of autocorrelation coefficients based on the traffic information acquired by the acquisition unit at the plurality of time points, a second calculating unit configured to calculate a plurality of weights based on the plurality of autocorrelation coefficients calculated by the first calculating unit, and a third calculating unit configured to calculate weighted averages of traffic at the plurality of time points based on the plurality of weights calculated by the second calculating unit, and the traffic information at the plurality of time points.

When an autocorrelation coefficient on traffic having a stationarity is calculated, the autocorrelation coefficient on a specific lag may be increased. For example, since the weight is increased when a autocorrelation coefficient is large, the accuracy of the predicted value may be increased.

The second calculating unit determines whether an absolute value of each of a plurality of autocorrelation coefficients is a certain threshold or more. When the absolute value of the autocorrelation coefficient is the certain threshold or more, the absolute value of the corresponding autocorrelation coefficient may be set to the weight, and when the absolute value of the autocorrelation coefficient is less than a first value, the weight may be set to a second value. The traffic that may contribute to the calculation of a predicted value may be handled differentfly from the traffic that may not contribute to the calculation of a predicted value.

The third calculating unit may calculate a weighted average by setting each of the plurality of weights to 1 when all of the plurality of weights calculated by the second calculating unit has the second values. As for the traffic not having a stationarity, the same value as the simple average is calculated.

For example, the number of a plurality of time points may be set to m, n may be set to a natural number that satisfies n<m, traffic at a time point n may be set to $v_n$, the weight at the time point n may be set to $w_n$, and an average of traffic at the plurality of time points may be set to avg. The third calculating unit calculates $w_{n-k}*v_k$ when the autocorrelation coefficient calculated by the first calculating unit is larger than 0, and calculates $w_{n-k}*(2*avg-v_k)$ when the autocorrelation coefficient calculated by the first calculating unit is smaller than 0, so that weighted averages of the traffic at the plurality of time points may be calculated. The weighted averages may be properly calculated.

The first calculating unit may generate a difference data stream from traffic information at the plurality of time points, and calculate a plurality of autocorrelation coefficients based on the corresponding generated difference data stream. Even if the traffic at the plurality of time points does not have a stationarity, the difference data stream may have a stationarity in some cases. Therefore, a predicted value with a high accuracy may be calculated using the stationarity of the difference data stream.

The management device may also have a control unit configured to control the communication device to perform a migration of a virtual object based on the weighted averages calculated by the third calculating unit. The occurrence of deviation in the traffic may be reduced.

The second value may be 0. The traffic that may not contribute to calculation of a predicted value may be ignored.

In the information processing system having a communication device and a management device for managing the communication device, the control method of the information processing system may include: acquiring traffic information on a port of the communication device at a plurality of time points from the communication device by the management device; calculating a plurality of autocorrelation coefficients based on the traffic information at the plurality of time points acquired by the acquisition unit; calculating a plurality of weights based on the plurality of autocorrelation coefficients calculated by the first calculating unit; and calculating weighted averages of traffic at the plurality of time points based on the plurality of weights calculated by the second calculating unit, and the traffic information at the plurality of time points.

A program for executing the process described above in a computer may be generated. The program is stored in, for example, a computer-readable storage medium or a storage device such as a flexible disk, a CD-ROM, a magneto-optical disk, a semiconductor memory, and a hard disk. The intermediate processing result may be temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An information processing system comprising: a communication device; and a management device configured to manage the communication device, wherein the management device: acquires traffic information on a port of the communication device at a plurality of time points from the communication device; calculates a plurality of autocorrelation coefficients based on the traffic information at the plurality of time points; calculates a plurality of weights based on the plurality of autocorrelation coefficients; and calculates a weighted average of traffic at the plurality of time points based on the plurality of weights and the traffic information at the plurality of time points; wherein the management device calculates the weighted average of the traffic at the plurality of time points, based on traffic at a time point k, wherein k is a natural number, among the plurality of time points, a weight at a time point n-k, wherein n is smaller than a number of the plurality of time points, among the plurality of time points, and a traffic average at the plurality of time points.

2. The information processing system according to claim 1, wherein the management device determines whether an absolute value of each of the plurality of autocorrelation coefficients is a threshold or more, and sets the weight of each of the plurality of autocorrelation coefficients based on determination result.

3. The information processing system according to claim 2, wherein the management device sets each of the weights to the absolute value of each of the autocorrelation coefficients when the absolute value is the threshold or more, and sets each of the weights to a first value when the absolute value is less than the threshold.

4. The information processing system according to claim 3, wherein the first value is 0.

5. The information processing system according to claim 3, wherein, when each of the weights of the plurality of autocorrelation coefficients is the first value, the management device sets each of the plurality of weights to a second value and calculates the weighted average.

6. The information processing system according to claim 1, wherein when the number of the plurality of time points is m, n is a natural number that satisfies n<m, a natural number representing a lag is k, traffic at a time point n is $v_n$, a weight at the time point n is $w_n$, and a traffic average at the plurality of time points is avg, the management device, for each of the plurality of autocorrelation coefficients, calculates $w_{n-k} * v_k$ when the autocorrelation coefficient is larger than 0, and calculates $w_{n-k}*(2*avg - v_k)$ when the autocorrelation coefficient is smaller than 0 so as to calculate the weighted averages of the traffic at the plurality of time points.

7. The information processing system according to claim 1, wherein the management device generates a difference data stream from the traffic information at the plurality of time points, and calculates the plurality of autocorrelation coefficients based on the difference data stream.

8. The information processing system according to claim 1, wherein the management device performs a migration of a virtual object based on the weighted average.

9. An information processing system comprising: a processor configured to execute a program; and a memory configured to store the program, wherein the processor is configured to: acquire traffic information on a port of a communication device at a plurality of time points from the communication device, based on the program; calculate a plurality of autocorrelation coefficients based on the traffic information at the plurality of time points; calculate a plurality of weights based on the plurality of autocorrelation coefficients; and calculate a weighted average of traffic at the plurality of time points based on the plurality of weights, and the traffic information at the plurality of time points; wherein the management device calculates the weighted average of the traffic at the plurality of time points, based on traffic at a time point k, wherein k is a natural number, among the plurality of time points, a weight at a time point n-k, wherein n is smaller than a number of the plurality of time points, among the plurality of time points, and a traffic average at the plurality of time points.

10. The information processing system according to claim 9, wherein the processor determines whether an absolute value of each of the plurality of autocorrelation coefficients is a threshold or more, and sets the weight of each of the plurality of autocorrelation coefficients based on determination result.

11. The information processing system according to claim 10, wherein the processor sets each of the weights to the absolute value of each of the autocorrelation coefficients when the absolute value is the threshold or more, and sets each of the weights to a first value when the absolute value is less than the threshold.

12. The information processing system according to claim 9, wherein the processor generates a difference data stream from the traffic information at the plurality of time points, and calculates the plurality of autocorrelation coefficients based on the difference data stream.

13. An information processing method comprising: acquiring traffic information on a port of a communication device at a plurality of time points from the communication device; calculating, by a processor, a plurality of autocorrelation coefficients based on the traffic information at the plurality of time points, calculating a plurality of weights based on the plurality of autocorrelation coefficients; and calculating a weighted average of traffic at the plurality of time points based on the plurality of weights, and the traffic information at the plurality of time points; wherein the management device calculates the weighted average of the traffic at the plurality of time points, based on traffic at a time point k, wherein k is a natural number, among the plurality of time points, a weight at a time point n-k, wherein n is smaller than a number of the plurality of time points, among the plurality of time points, and a traffic average at the plurality of time points.

14. The information processing method according to claim 13, wherein an absolute value of each of the plurality of autocorrelation coefficients is a threshold or more is determined, and the weight of each of the plurality of autocorrelation coefficients based on determination result.

15. The information processing method according to claim 14, wherein each of the weights is set to the absolute value of each of the autocorrelation coefficients when the absolute value is the threshold or more, and each of the weights is set to a first value when the absolute value is less than the threshold.

16. The information processing method according to claim 13, wherein a difference data stream is generated from the traffic information at the plurality of time points, and the plurality of autocorrelation coefficients are calculated based on the difference data stream.

\* \* \* \* \*